United States Patent Office 3,190,567
Patented June 22, 1965

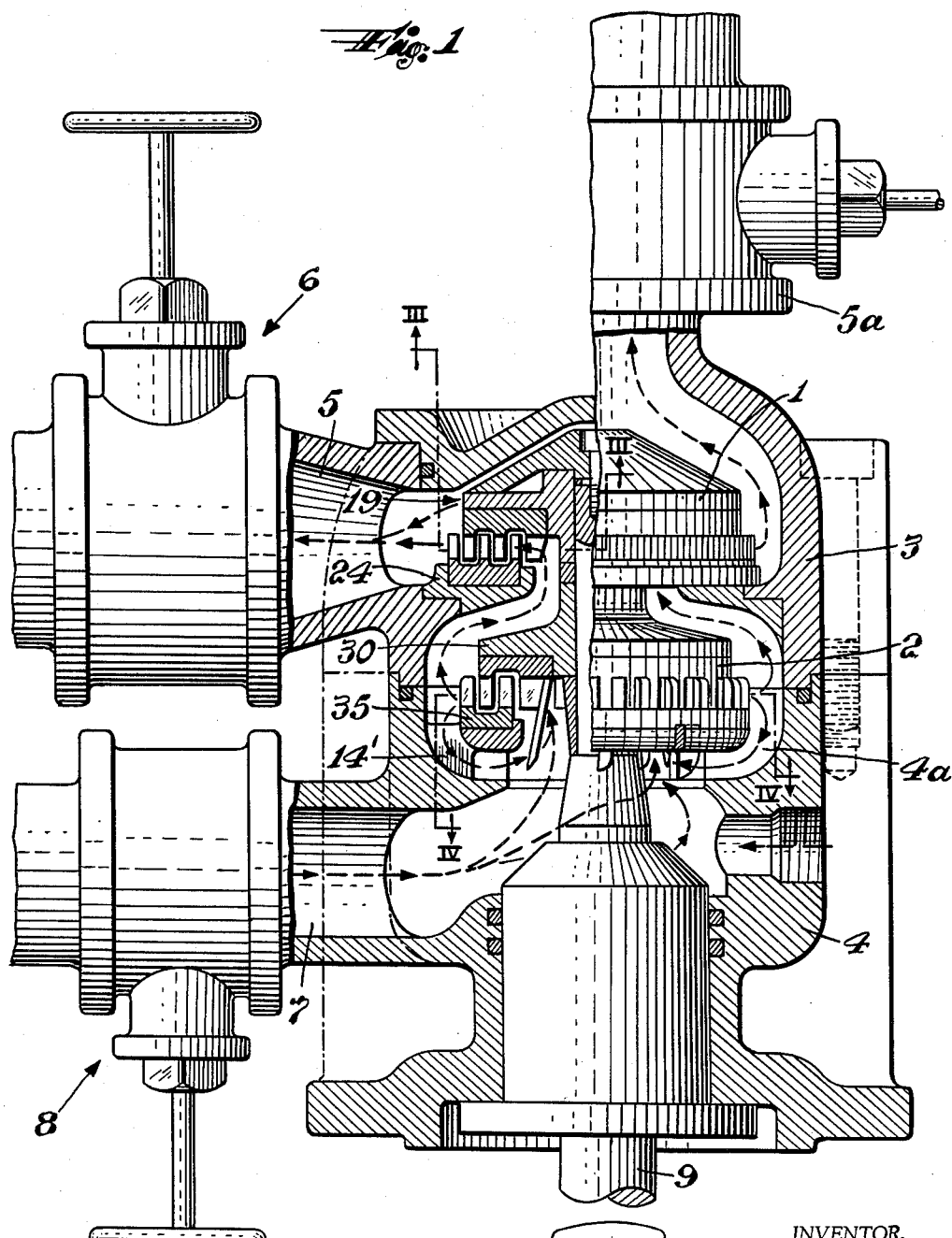

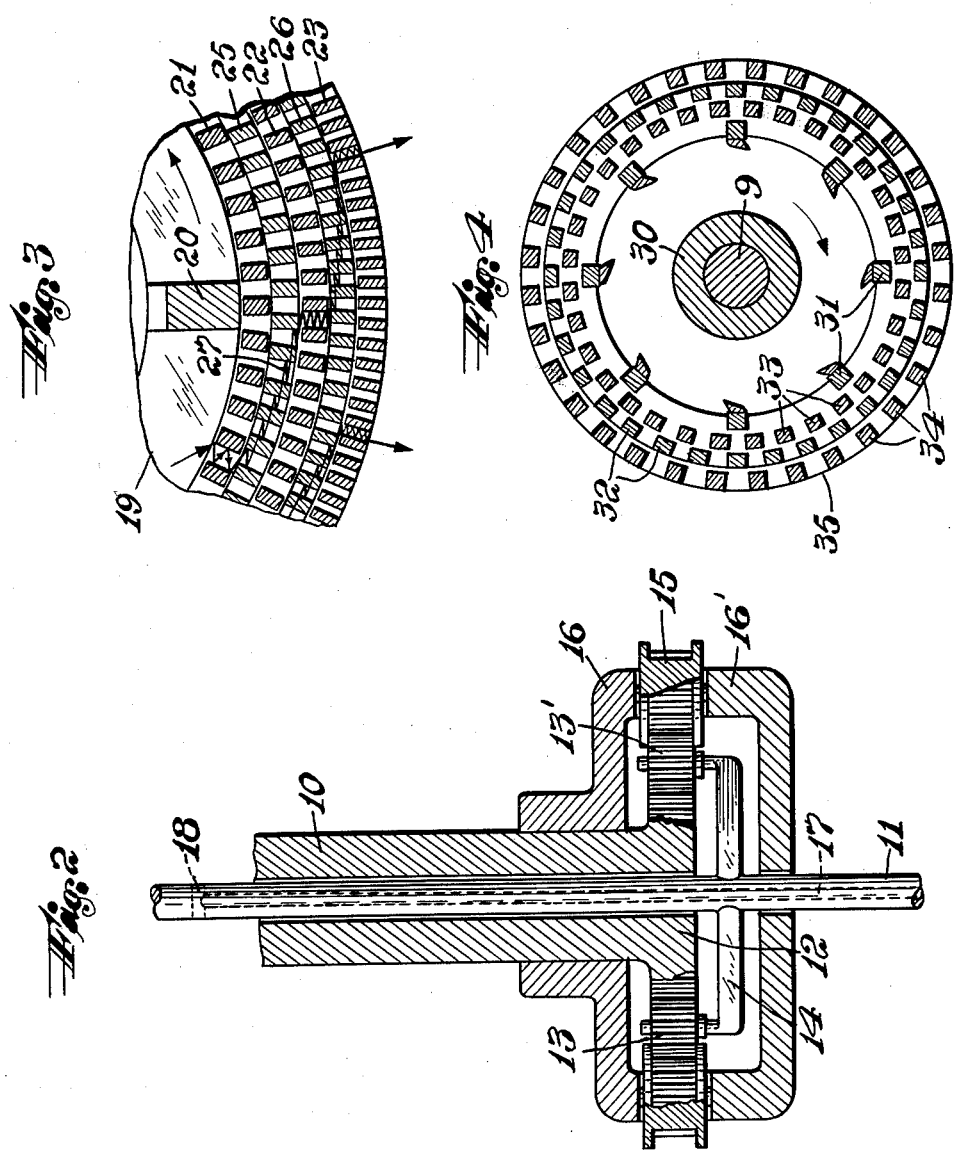

3,190,567
APPARATUS FOR THE TREATMENT OF PUMP-
ABLE SUBSTANCES BY MEANS OF HIGH-
FREQUENCY OSCILLATIONS
Peter Willems, 20–22 Steinhofhalde, Lucerne, Switzerland
Filed Jan. 17, 1963, Ser. No. 252,255
Claims priority, application Switzerland, Jan. 22, 1962,
711/62
5 Claims. (Cl. 241—162)

The invention relates to apparatus for the treatment of pumpable substances by high-frequency oscillations, for example, for the purpose of dissolving, mixing, spraying, perfecting and digesting by various means, as well as for refining, impregnating and inducting or accelerating a chemical reaction, such as, oxidation, reduction, bleaching, and the like.

The term "pumpable substances," as employed herein, refers to substances and mixtures of substances which are naturally capable of flowing or pouring, and thus capable of being pumped, and also those substances and mixtures of substances which, when introduced into a carrier liquid or otherwise, are rendered capable of flowing.

U.S. Letters Patent No. 3,062,457, issued November 6, 1962, to the present applicant discloses an apparatus and process for the treatment of substances and mixtures of substances by high frequency oscillatory pulses, and wherein the duration and effect of the treatment of the particles of the substance which are caused to oscillate at a high frequency are both regulated. To this end, the apparatus of the above patent is provided with valves for controlling the overall rate of flow through the apparatus and also the back or counter-pressure.

The homogeneity of the end product which issues from the apparatus of the above patent is, among other things, governed to an appreciable degree by the uniformity of the substances or mixtures of substances to be treated before the same are introduced into the apparatus. When, for instance, a heterogeneous mixture of particles having highly variable dimensions is introduced into the apparatus, the homogeneity of the product issuing from the apparatus may not be sufficient. In such cases, the substance must be subjected to further treatment by routing it again through the apparatus.

Although efforts have been made to subject the stock to be treated in the apparatus of U.S. Letters Patent No. 3,062,457 to prior treatment in a disintegrator and in other conventional devices for the purpose of fragmenting the stock, it has been found that even such prior treatment does not always result in the requisite homogeneity.

Accordingly, it is the principal object of the invention to provide apparatus by which it is feasible to obtain even from heterogeneous substances, and by means of a single operation, end products of an intended degree of fineness and of enduring homogeneity.

The process carried out with the apparatus in accordance with the invention generally consists in introducing the stock to be treated into a first pressure chamber which is traversed by the oscillatory field of at least one oscillation generator, with the stock being subjected in the latter to continuous rotation and high-frequency oscillations for mixing and homogenizing the stock, transferring more or less of the stock thus homogenized in the first pressure chamber to a second pressure chamber, with the stock which is not transferred being recycled through the first chamber, subjecting the stock transferred to the second chamber to oscillatory pulses at high frequencies in accordance with the method disclosed in U.S. Letters Patent No. 3,062,457, and regulating the back or counter-pressure on the second pressure chamber, thereby to control or determine the proportions of the stock which are transferred to the second chamber from the first chamber and recycled in the latter, respectively.

In accordance with an aspect of this invention, an apparatus is provided which comprises a combination of two devices which are individually known, and, more specifically, wherein a device for dispersing and homogenizing the stock, and which is generally in the form of a rotary mechanical oscillator, for example, as disclosed in U.S. Letters Patent No. 2,882,149 or in U.S. Letters Patent No. 2,789,800, is connected in advance of a device, as disclosed in U.S. Letters Patent No. 3,062,-457, which broadly constitutes a kinematically operating generator having acoustic treating chambers bounded by oscillating walls, and valves are provided for regulating the overall rate of flow from the last mentioned device and the back or counter-pressure thereon for adjusting the recycling of the stock in the first mentioned device.

By reason of the above combination pursuant to the invention, the homogeneity of the end product can be regulated by setting the overall rate of flow, and hence the duration of treatment, and the counter-pressure. In the event that the end product issuing from the second device does not exhibit adequate homogeneity, the setting is modified to provide higher counter-pressure which feeds-back to the first device, and thereby reduces the proportion of the stock passing from the first to the second device. Thus, the stock is forced to remain for a longer period in the first device, wherein it is thus more frequently rotated, and subjected for a more extended period to the high-frequency oscillations so as to be better homogenized.

It is thus a surprising result of the invention that this feed-back of the counter-pressure has the effect of improving the homogeneity of the end product.

The above, and other objects, features and advantages of the invention, will be apparent in the following detailed description of illustrative embodiments thereof which is to be read in connection with the accompanying drawings, wherein:

FIG. 1 is a partly schematic view in axial section of an apparatus embodying the present invention;

FIG. 2 is an axial sectional view of the drive for an apparatus which is a modification of that illustrated on FIG. 1;

FIG. 3 shows a portion of the apparatus of FIG. 1 in radial section on the line III—III; and FIG. 4 is a corresponding radially sectional view taken on the line IV—IV in FIG. 1.

Referring to FIG. 1 in detail, it will be seen that the apparatus embodying the invention, as there illustrated, generally consists of an upper device 1 which is of the type disclosed in detail in U.S. Letters Patent No. 3,062,-457, and a lower device 2 through which the stock is passed before entering the device 1, such device 2 being of a type which is disclosed in detail as one of the operating units of the apparatus of U.S. Letters Patent No. 2,789,800. The housing 3 of the device 1 is directly bolted to the housing 4 of the device 2 so that the stock, after being adequately dispersed or mixed and homogenized by the device 2 can pass directly into the device 1 for further treatment in the latter prior to discharge from the apparatus through a tangentially extending outlet 5 provided with a throttling valve 6. The stock to be treated is supplied to the apparatus through an inlet 7 opening into the housing 4 of the device 2 and provided with a throttling or regulating valve 8. By suitably adjusting the valves 6 and 8, the overall rate of flow of the stock can be controlled as well as the pressure conditions within the apparatus. Further, adjustment of the valve 6 makes it possible to vary the back or counter-pressure on the device 1 and, through the latter, also on the device 2, and such back or counter-pressure determines the extent to which the stock treated in the device 2 is either transferred to the device 1 for treatment by the latter or recycled for further treatment in the device 2 through a conduit 4a which connects the peripheral output portion of the device 2 with its central intake or entrance portion. Recycling is resorted to when the end products issuing from the outlet 5 is found to be inadequately homogenized. When the valve 6 is completely closed, all transfer of stock from the device 2 into the device 1 is halted, and the stock is continuously recycled in the device 2. As the valve 6 is progressively opened, the extent of the recycling or recirculation of the stock through the device 2 is reduced, so that the stock is less dispersed and homogenized when it passes or is transferred into the upper device 1. Thus, control of the valve 6 makes it possible to regulate, over a relatively wide range, the homogeneity of the stock entering the upper device 1 and, thereby, also the homogeneity of the end product issuing from the outlet 5, even though the initial stock introduced at the inlet 7 may be formed of a substance or mixture of substances having particles with widely varying dimensions. The initial stock is preferably supplied under pressure to the inlet 7 of the apparatus, and such pressure can be controlled by suitable adjustments of the throttling valve 8.

The outlet 5 from the apparatus may extend tangentially from housing 3, as mentioned above, or the apparatus may be provided with an axially extending outlet, as indicated at 5a on the right-hand portion of FIG. 1.

The structure and operation of the device 1 is more fully disclosed in U.S. Letters Patent No. 3,062,457. The device has a rotor 19 disposed coaxially within the housing 3 and fixed on the end portion of a shaft 9 which is suitably driven by a motor (not shown). The rotor of device 1 carries, as can be seen in FIG. 3, an inner annular row of vanes 20 for centrifugal acceleration of the stock received from the device 2, and also two annular rows of resilient oscillating blades 25 and 26. These oscillating blades have their greatest dimension or length in the direction of the axis of the shaft 1, and their radial width is substantially greater than their circumferential thickness so that each blade has the shape and oscillating properties of a tine of a tuning fork with its free end being adapted to oscillate preferably in an approximately tangential path.

Circumferentially adjacent pairs of the oscillating blades of device 1 define acoustic treating chambers therebetween, with the numbers of such acoustic chambers increasing from row to row in the radially outward direction.

The inlet to the device 1 is defined by the inner periphery of an annular flange 24 on the housing 3 which constitutes the stator of the device 1. The stator of the device 1 has annular rows of oscillating blades 21, 22, 23 similar to the oscillating blades of the rotor, with each row of stator blades fitting closely between rows of oscillating blades on the rotor without normally touching them. The circumferentially adjacent stator blades of each row define acoustic treating chambers, and the numbers of such chambers defined by the rows of stator blades increases, from row to row, in a radially outward direction. The thicknesses of the blades preferably decrease from row to row in the radially outward direction so that the natural frequency of oscillation of the blades changes correspondingly. The oscillations of the blades are excited by the blades of adjacent rows passing closely at high relative velocity. Further, the oscillating blades of each row preferably have circumferential thicknesses at least substantially equal to the circumferential dimension of the acoustic chambers defined between the blades of adjacent rows, whereby such acoustic chambers are alternately opened and closed during rotation of the rotor relative to the stator.

It will be apparent that the primary sonic or supersonic oscillatory pulses resulting from the passing of the blades of adjacent rows at high relative velocity are propagated radially through the pumpable stock contained in the acoustic chambers, and secondary waves traveling in a tangential or circumferential direction are produced in the acoustic chambers by the vibrations of the oscillating blades bounding the latter. Further, the sound waves emitted from one oscillating blade bounding an acoustic chamber are reflected by the opposite oscillating blade bounding the same acoustic chamber. Thereby, interference oscillations are set up in the acoustic chambers at a frequency which is often very much higher than the natural frequency of the oscillating blades. Since the acoustic chambers are alternately more or less opened and closed during rotation of the rotor relative to the stator in device 1, the pumpable stock being treated is retained in each acoustic chamber and subjected to the high frequency pulses and oscillations within the latter. By the temporary containment of the stock in an acoustic chamber formed by vibrating walls, the stock can pass into a chamber of the next outer row of oscillating blades only after being transported over a circumferential distance, and therefore the stock travels along a spiral of successive stages, as indicated by the line 27 in FIG. 3. In addition to the foregoing oscillatory treatment of the stock in the acoustic chambers of the device 1, the stock is subjected to a kinematic treatment, and a diffuse bouncing effect which cause intensive turbulence and heating of the treated stock for aiding the refining and disintegration thereof.

Although the structure and operation of the device 2 for dispersing and homogenizing the stock prior to the treatment thereof in the above described device 1 are fully disclosed in U.S. Letters Patent No. 2,789,800, it is evident from joint consideration of FIGS. 1 and 4 that the device 2 includes a rotor 30 fixed on the shaft 9 below the rotor of device 1 and carrying crowns or spaced circular rows of toothed or otherwise shaped rigid comminuting members 31, 32. The teeth or comminuting members of the rotor of device 2 run past identically or similarly shaped fixed comminuting members 33, 34 which are located on an annular stator 35 secured to the outer wall of the housing 4 by arms 14' which extend radially from the housing 4 so as not to obstruct the return conduit 4a between housing 4 and the outer periphery of the annular stator 35 through which the stock can be recycled for repeated circulation and treatment in the device 2.

When the outlet valve 6 is completely open and the inlet valve 8 is adjusted so that the end product can flow freely from the outlet 5, then the stock treated in the device 2, on the whole, takes the path of least resistance and thereby flows directly into the device 1. If the homogeneity of the end product thus obtained is inadequate, then progressive closing of the valve 6 creates a back or counter pressure resisting the transfer of stock from device 2 into device 1, and thereby causes more or less recycling of the stock in the device 2 through the spaces defined between the arms supporting the stator of device 2. When valve 6 is completely closed, so that there can be no overall flow of stock through the apparatus, the housings 3 and 4 are completely filled with stock supplied thereto under the pressure at the inlet 7 and the stock within housing 4 is repeatedly recycled through the device 2 so as to obtain any desired degree of dispersion and homogenization.

It will be apparent that, in the arrangement illustrated on FIG. 1, the maximum size of the particles contained in the stock to be treated is limited only by the radial clearance between the inner periphery of the annular stator 35 of device 2 and the outer diameter of the hub of the rotor 30 of device 2 on shaft 9.

It will be apparent that, in addition to the control exercised by adjustment of the valves 6 and 8, the apparatus embodying this invention is controllable by varying the speed of rotation of the rotors of devices 1 and 2. In order to make it possible to thus control the devices 1 and 2 independently of each other, the rotors of the devices 1 and 2 may be mounted on individual, coaxial driving shafts, one of which is hollow so as to permit the extension of the other shaft axially therethrough. When the rotors of the devices 1 and 2 are driven by individual or independent shafts, such shafts may be advantageously rotated by the drive system illustrated on FIG. 2. In such a drive system, the outer hollow shaft 10, which may carry the rotor of the lower device 2, has the inner shaft 11 extending axially therethrough for connection to the rotor of the upper device 1. A sun gear 12 is secured on, or formed integral with the lower end of the outer hollow shaft 10 and meshes with epicyclic gears 13 and 13' which are rotatably mounted on a satellite carrier 14 secured to the inner shaft 11. The epicyclic or planet gears 13 and 13' also mesh with an internally toothed gear ring 15 which is rotatably mounted in a fixed housing 16, 16', and which can be more or less held against rotation by a brake band (not shown) adapted to frictionally engage the outer periphery of ring gear 15.

With the drive system of FIG. 2, the motor (not shown) for operating the apparatus is suitably coupled to the inner shaft 11. So long as the ring gear 15 is free to rotate, the shafts 10 and 11 will turn at the same speed. However, when the brake is applied to the ring gear 15 to decelerate the latter, the differential between the rotational speeds of the shafts 10 and 11 increases progressively in the manner that is well known in connection with planetary gearing until a maximum speed differential is obtained in the case where the ring gear 15 is stationary. Thus, by regulating the rotational speed of the drive motor, and hence of the inner shaft 11, and by controlling the braking action on the ring gear 15, it is possible to provide the shafts 10 and 11, and the respective devices 2 and 1 with various operating speeds and with various ratios of operating speeds, thereby to provide a correspondingly wide range of operating conditions for the two devices 1 and 2.

When it is desired to introduce an additive or reagent into the stock during the treatment thereof in the described apparatus, such additive or reagent may be supplied through the common shaft 9 (FIG. 1) or through an axial bore 17 in the inner shaft 11 (FIG. 2) having radial openings 18 into housing 3 or housing 4, or the additive or reagent may be introduced through suitable passages in the housings or stator blades of the devices 1 and 2.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. Apparatus for treating pumpable materials comprising a housing structure defining first and second axially successive compartments communicating directly with each other and respectively having an inlet for the material to be treated and an outlet for the treated material, a first rotor in said first compartment, a first stator in said first compartment, said first motor and stator having cooperating annular rows of rigid teeth cooperating upon rotation of said first rotor to disperse and homogenize the material during the radially outward passage of the material therebetween from an entrance surrounded by said first stator, said first stator being spaced from the wall surface of said first compartment to define therewith a conduit for recycling of the material back to said entrance, a second rotor and a second stator in said second compartment, resilient blades on said second rotor and stator arranged in coaxial, radially contiguous, annular rows which alternately project from the second rotor and stator, the blades in each row being circumferentially spaced to define acoustic chambers therebetween and the circumferential thickness of the blades in each row being at least substantially equal to the circumferential dimensions of the acoustic chambers defined by blades in adjacent rows so that said acoustic chambers are alternately opened and closed during rotation of said second rotor, and means for controlling the back-pressure at said outlet, which back-pressure acts through said second compartment to control the recycling of the material through said first compartment.

2. Apparatus as in claim 1; wherein said first and second rotors are mounted on a common drive shaft.

3. Apparatus as in claim 1; wherein said first and second rotors are mounted on respective shafts; and further comprising means for driving said shafts at different speeds.

4. Apparatus as in claim 3; wherein one of said shafts is hollow and the other of said shafts is an inner shaft extending coaxially through said hollow shaft; and wherein said means for driving the shafts includes a sun gear on one of said shafts, a planet gear meshing with said sun gear, a planet gear carrier on the other shaft, a rotatable ring gear meshing with said planet gear, and braking means for variably resisting rotation of said ring gear.

5. Apparatus as in claim 1; further comprising conduit means for directly supplying an additive substance to one of said compartments.

References Cited by the Examiner

UNITED STATES PATENTS

| | | | |
|---|---|---|---|
| 2,515,542 | 7/50 | Yellott | 241—1 |
| 2,709,552 | 5/55 | Lecher | 241—1 |
| 2,828,087 | 3/58 | Knoedler | 241—162 |
| 2,882,149 | 4/59 | Williams | 241—162 X |
| 2,893,649 | 7/59 | Mischanski | 241—162 |
| 2,983,453 | 5/61 | Bourguet et al. | 241—1 |
| 3,003,707 | 10/61 | Lecher | 241—1 |

ANDREW R. JUHASZ, *Primary Examiner.*

J. SPENCER OVERHOLSER, *Examiner.*